United States Patent [19]
Yamasaki et al.

[11] Patent Number: 5,626,962
[45] Date of Patent: May 6, 1997

[54] CO-COATED ACICULAR MAGNETITE PARTICLES AND PROCESS FOR PRODUCING THE SAME

[75] Inventors: Minoru Yamasaki; Junichi Kawano, both of Ube; Hideaki Sadamura, Onoda; Katsumi Yamashita, Ube, all of Japan

[73] Assignee: Toda Kogyo Corporation, Japan

[21] Appl. No.: 394,349

[22] Filed: Feb. 27, 1995

[30] Foreign Application Priority Data

Mar. 4, 1994 [JP] Japan ................................... 6-060036

[51] Int. Cl.$^6$ ........................................................ B32B 5/16
[52] U.S. Cl. ...................... 428/403; 252/62.64; 428/404; 428/694 BA; 428/701; 428/702; 428/900
[58] Field of Search ...................... 428/403, 701, 428/702, 404, 694 BA, 900; 252/62.56, 62.62, 62.64

[56] References Cited

U.S. PATENT DOCUMENTS

| | | | |
|---|---|---|---|
| 4,259,368 | 3/1981 | Rudolf et al. | 427/130 |
| 4,539,261 | 9/1985 | Nakata et al. | 428/403 |
| 4,657,816 | 4/1987 | Siddiq | 428/403 |
| 5,120,604 | 6/1992 | Nakamura | 428/403 |
| 5,151,115 | 9/1992 | Tamai | 75/348 |
| 5,183,709 | 2/1993 | Schwab et al. | 428/404 |
| 5,188,898 | 2/1993 | Tagawa et al. | 428/403 |
| 5,260,132 | 11/1993 | Nakazumi et al. | 428/403 |
| 5,294,492 | 3/1994 | Oka et al. | 428/403 |
| 5,449,565 | 9/1995 | Aoki et al. | 428/694 BA |

FOREIGN PATENT DOCUMENTS

| | | |
|---|---|---|
| 0160496 | 11/1985 | European Pat. Off. . |
| 0393563 | 10/1990 | European Pat. Off. . |
| 0555056 | 8/1993 | European Pat. Off. . |
| 0597694 | 5/1994 | European Pat. Off. . |
| 62-50889 | 10/1987 | Japan . |
| 1-184801 | 7/1989 | Japan . |
| 2-30563 | 7/1990 | Japan . |
| 4-25686 | 5/1992 | Japan . |

*Primary Examiner*—Hoa T. Le
*Attorney, Agent, or Firm*—Nixon & Vanderhye

[57] ABSTRACT

Co-coated acicular magnetite particles each comprising:

acicular magnetite particle as the core particle;

a lower coating layer of Co-containing spinel ferrite having a spinel structure, which is formed on the surface of said acicular magnetite particle; and an upper coating layer of Co- and Mg-containing spinel ferrite having a spinel structure, which is formed on said lower coating layer.

6 Claims, No Drawings

5,626,962

CO-COATED ACICULAR MAGNETITE PARTICLES AND PROCESS FOR PRODUCING THE SAME

BACKGROUND OF THE INVENTION

The present invention relates to Co-coated acicular magnetite particles and a process for producing the same, and more particularly, the present invention relates to Co-coated acicular magnetite particles which have a high coercive force, a large saturation magnetization, an excellent black chromaticity and an excellent chemical and magnetic stability with passage of time (chemical and magnetic temporal stability), and hence, which are suitable as magnetic oxide particles for high-density recording media, and to a process for producing the same.

With the recent development of miniaturized and light-weight magnetic recording apparatuses, the necessity for a higher performance of a recording medium such as a magnetic tape and a magnetic disk has been increasing more and more.

In other words, a magnetic recording medium is required to have a high recording density, a small light transmittance, and an excellent magnetic and chemical stability.

The characteristics of the magnetic iron oxide particles which are demanded in order to satisfy the above-mentioned requirements to the magnetic recording medium, are to be high in coercive force, large in saturation magnetization, excellent in black chromaticity and excellent in chemical and magnetic stability with passage of time.

This fact is described in, for example, Japanese Patent Publication (KOKOKU) No. 55-6580 (1980), "There is an increasing tendency of a recording signal moving to a shorter-wavelength region, and this tendency is especially remarkable in video cassettes. That is, a magnetic recording medium is required to have a high recording density, high output characteristics, especially, improved frequency characteristics, and in addition, a magnetic stability. In order to meet such demands, a magnetic material for such a magnetic recording medium should have a high magnetic stability and a high coercive force (Hc)".

As magnetite particles having a high coercive force, what is called Co-doped magnetic iron oxide particles and what is called Co-coated magnetic iron oxide particles are conventionally known.

As is known, the Co-doped magnetic iron oxide particles are very unstable both chemically and magnetically, while the chemical and magnetic stability of the Co-coated magnetic iron oxide particles is rather excellent as compared with that of the Co-doped magnetic iron oxide particles. Especially, when the precursor particles are magnetite particles, Co-coated magnetic iron oxide particles have a higher coercive force, a larger saturation magnetization and a more excellent black chromaticity than those having maghemite particles as the precursor particles, so that the magnetite particles are expected to be used as magnetic iron oxide particles for high-density recording media.

With respect to black chromaticity, it is known that black chromaticity mainly depends on the $Fe^{2+}$ content and that the black chromaticity has a tendency of increasing with an increase in the $Fe^{2+}$ content, as described in pp. 239 to 240 of *Powder and Powder Metallurgy*, Vol. 26, No. 7, "The black chromaticity of the sample depends upon the Fe(II) content and the average particle diameter. The particles having an average particle diameter of 0.2 μm are a bluish black powder which is the most suitable for a black pigment. . . . When the Fe(II) content is not less than 10%, each sample assumes a black color, although there is a slight difference in the black chromaticity. If the Fe(II) content reduces to less than 10%, the black color of each sample changes to a reddish brown color". Since Co-coated magnetite particles contain $Fe^{2+}$, they have a higher black chromaticity than Co-coated maghemite particles.

It is essential for magnetic recording media such as magnetic tapes, especially, video tapes to reduce the light transmittance by adding carbon black in a magnetic layer. However, addition of carbon black has the following problems. Addition of a large amount of carbon black which does not contribute to an increase in the magnetic properties obstructs the enhancement of the properties of the magnetic recording media. Furthermore, the existence of carbon black in a film composition, when it is produced by kneading magnetic iron oxide particles with a vehicle, obstructs the dispersion of the magnetic iron oxide particles in the vehicle, resulting in the lowering of the orientation and the packing property of the magnetic iron oxide particles in the coating film.

Since carbon black has a high bulk density of about 0.1 g/cm$^3$, it is difficult to handle and the operability is not good. In addition, there is concern that carbon black particles may be carcinogenic.

An attempt has been made of using Co-coated magnetite particles having a higher black chromaticity than conventional Co-coated maghemite particles in order to lessen the light transmittance of a video tape or the like, thereby reducing the carbon black content.

However, although Co-coated magnetite particles have more excellent properties than Co-coated maghemite particles, as described above, it is known Co-coated magnetite particles are magnetically and chemically unstable due to the existence of $Fe^{2+}$ in the particles.

This fact is described in Japanese Patent Publication (KOKOKU) No. 55-6580 (1980), "Co-containing acicular magnetite particles have a high coercive force and a large saturation magnetization, . . . and they are expected to be used as a material for magnetic recording, but they are disadvantageous in that the coercive force largely changes with passage of time due to the existence of $Fe^{2+}$ in the particles", and ". . . when Co-containing acicular magnetite particles are taken out in the air, they are oxidized and the $Fe^{2+}$ content is reduced from the stoichiometric quantity, which may cause vacancies in a crystal lattice. When such Co-containing acicular magnetite particles are permitted to stand at room temperature, the positive ions ($Fe^{2+}$, $Co^{2+}$) by way of the vacancies move to a stable position, so that the coercive force is considered to gradually increase with passage of time. . . . It is due to the coordination of ions in a crystal lattice that the coercive force changes with passage of time when Co-containing acicular magnetite particles are permitted to stand at room temperature . . . . . . . When the Co-containing acicular magnetite particles are permitted to stand at room temperature, the $Fe^{2+}$, $Co^{2+}$ ions by way of the vacancies move to a stable position, and as a result the coercive force changes with passage of time".

When Co-coated acicular magnetite particles are permitted to stand for a predetermined period, phenomena such as a reduction of $Fe^{2+}$ content with passage of time (chemical instability) and a lowering of the saturation magnetization with passage of time (magnetic instability) are produced.

Various attempts of adding a magnesium salt have conventionally been made in order to improve various properties of Co-coated acicular iron oxide particles. For example, there are a method of adding an aqueous solution of a magnesium salt simultaneously with the addition of an aqueous solution of a ferrous salt or an aqueous solution of a cobalt salt, or between the addition of an aqueous solution of a ferrous salt and the addition of an aqueous solution of a cobalt salt in a cobalt coating process (Japanese Patent Publication (KOKOKU) No. 4-25686 (1992)); a method of dissolving a magnesium salt in a water dispersion of Co-coated ferromagnetic particles and adding an alkali hydroxide so as to deposit the magnesium hydroxide produced on the surfaces of ferromagnetic particles (Japanese Patent Publication (KOKOKU) No. 62-50889 (1987)); a method of repulping a cake obtained by filtering and washing Co-coated acicular iron oxide particles with water so as to slurry the particles again, and coating the surfaces of the particles with a hydroxide of magnesium by adding an aqueous solution of a magnesium salt to the slurry (Japanese Patent Publication (KOKOKU) No. 2-30563 (1990)); a method of adding a magnesium salt to washing water when the alkaline slurry of the Co-modified γ-iron oxide particles obtained by modifying γ-iron oxide particles by cobalt is washed with water (Japanese Patent Application Laid-Open (KOKAI) No. 1-184801 (1989)); and a method of adding an aqueous solution of a cobalt salt, an aqueous salt solution of a Fe(II), a strontium salt or a barium salt to a water dispersion of acicular iron oxide particles, and adding a magnesium compound in the process of the cobalt coating reaction (Japanese Patent Application Laid-Open (KOKAI) No. 4-168703 (1992)).

Magnetic iron oxide particles having a high coercive force, a large saturation magnetization and an excellent black chromaticity are now in the strongest demand. However, any of the magnetic iron oxide particles described in Japanese Patent Publication (KOKOKU) Nos. 4-25686 (1992), 62-50889 (1987) and 2-30563 (1990) and Japanese Patent Application Laid-Open (KOKAI) Nos. 1-184801 (1989) and 4-168703 (1992) cannot be said to be satisfactory.

In the magnetic iron oxide particles described in Japanese Patent Publication (KOKOKU) No. 4-25686 (1992), since a magnesium salt is added before the cobalt coating reaction, the Co-coated layer produced uniformly contains magnesium. It is thus impossible to form a two-layer structure composed of a lower layer composed of spinel ferrite containing cobalt and an upper layer composed of spinel ferrite containing cobalt and magnesium.

The magnetic iron oxide particles described in Japanese Patent Publication (KOKOKU) No. 4-25686 (1992) show an improved dispersibility in a magnetic tape obtained by dispersing the magnetic iron oxide particles in a binder.

The magnetic iron oxide particles described in Japanese Patent Publication (KOKOKU) Nos. 62-50889 (1987) and 2-30563 (1990) are obtained by coating the surfaces of the magnetic iron oxide particles with a hydroxide or an oxide of magnesium. These particles show an improved dispersibility in a magnetic tape obtained by dispersing the magnetic iron oxide particles in a binder.

In the magnetic iron oxide particles described in Japanese Patent Application Laid-Open (KOKAI) Nos. 1-184801 (1989), the magnetic stability with passage of time (magnetic temporal stability) is improved by adding an aqueous solution of a magnesium salt to an alkaline slurry of the cobalt-modified acicular maghemite particles and coating the surfaces of the particles with a hydroxide of magnesium. Acicular maghemite particles which contain no $Fe^{2+}$ and, hence, which do not produce chemical and magnetic unstability with passage of time (chemical and magnetic temporal unstability) due to the existence of $Fe^{2+}$, are used as the core particles of these magnetic iron oxide particles.

In the method described in Japanese Patent Application Laid-Open (KOKAI) No. 4-168703 (1992), a magnesium salt is added to a water dispersion containing barium and the like in the process of the cobalt coating reaction. When a magnesium salt is added, a barium salt or a strontium salt which has a larger ionization degree, already exists in the slurry. Therefore, since barium or strontium preferentially contributes to the formation of a spinel ferrite layer, it is difficult to form a spinel ferrite coating containing cobalt and magnesium (see Comparative Example 6 which will be described later).

Accordingly, the technical problem to be solved in the present invention is to produce magnetic iron oxide particles which have a high coercive force, a large saturation magnetization and an excellent black chromaticity, and which are magnetically and chemically stable with passage of time.

Fine magnetic particles have recently been used for enhancing the smoothness of the surface of a magnetic tape. On the other hand, if magnetic particles are fine, the specific surface area increases, so that a large amount of lubricant such as a fatty acid is adsorbed to the particle surfaces and it is difficult to supply the lubricant to the surface of the magnetic tape, which may result in the deterioration of the running durability. This fact is described in, for example, Japanese Patent Application Laid-Open (KOKAI) No. 1-199316 (1989), ". . . A fatty acid or an ester of a fatty acid and an aliphatic alcohol is added to a magnetic layer as a lubricant so as to reduce the friction coefficient. However, in many cases of a magnetic recording medium using fine ferromagnetic particles, the lubricant cannot produce its desired effect . . . ." Therefore, favorable magnetic particles are those which adsorb as little a fatty acid as possible, namely, magnetic particles having a small fatty acid adsorptivity.

As a result of studies undertaken by the present inventors so as to solve the above-described technical problems, it has been found that by heating and stirring a suspension obtained by adding an aqueous alkali hydroxide solution and an aqueous solution of a cobalt salt to an aqueous dispersion of acicular magnetite particles, or a suspension obtained by adding an aqueous alkali hydroxide solution, an aqueous solution of a cobalt salt and an aqueous solution of a ferrous salt to an aqueous dispersion of acicular magnetite particles, to form a Co-containing ferrite having a spinel structure (spinel ferrite containing cobalt) on the surface of the acicular magnetite particle; adding an aqueous solution of a magnesium salt to either of the suspensions in the process of a cobalt coating reaction for forming the Co-containing ferrite having a spinel structure (spinel ferrite containing cobalt) on the surface of the acicular magnetite particle; and continuing to heat and stir the resulting mixture so as to complete the cobalt coating reaction, thereby forming a Co-and Mg-containing ferrite having a spinel structure (spinel ferrite containing cobalt and magnesium) on the surface of the Co-containing ferrite coating layer which is formed on the surface of the acicular magnetite particle, the Co-coated acicular magnetite particles obtained have a high coercive force, a large saturation magnetization, an excellent black chromaticity and an excellent chemical and magnetic stability with passage of time (chemical and magnetic temporal stability). On the basis of this finding, the present invention has been achieved.

SUMMARY OF THE INVENTION

It is an object of the present invention to provide Co-coated acicular magnetite particles which have a high coercive force, a large saturation magnetization, an excellent black chromaticity and an excellent chemical and magnetic stability with passage of time (chemical and magnetic temporal stability), and hence, which are suitable as magnetic oxide particles for high-density recording media, and a process for producing the same.

To achieve this aim, in a first aspect of the present invention, there is provided Co-coated acicular magnetite particles each comprising: acicular magnetite particle as the core particle; a lower coating layer composed of a Co-containing ferrite having a spinel structure (spinel ferrite containing cobalt) which is formed on the surface of the acicular magnetite particle; and an upper coating layer composed of Co- and Mg-containing ferrite having a spinel structure (spinel ferrite containing cobalt and magnesium) which is formed on the lower coating layer.

In a second aspect of the present invention, there is provided Co-coated acicular magnetite particles each comprising: acicular magnetite particle as the core particle; a lower coating layer composed of a Co-containing ferrite having a spinel structure (spinel ferrite containing cobalt) which is formed on the surface of the acicular magnetite particle; an upper coating layer composed of Co- and Mg-containing ferrite having a spinel structure (spinel ferrite containing cobalt and magnesium) which is formed on the lower coating layer, and at least one uppermost coating layer composed of a compound containing at least one element selected from the group consisting of Si and Al which is formed on the surface of the upper coating layer.

In a third aspect of the present invention, there is provided a process for producing Co-coated acicular magnetite particles comprising the steps of:

heating and stirring a suspension obtained by adding an aqueous alkali hydroxide solution and an aqueous solution of a cobalt salt to an aqueous dispersion of acicular magnetite particles;

adding an aqueous solution of a magnesium salt to said suspension in the process of the cobalt coating reaction; and continuing to heat and stir the resulting mixture so as to complete said cobalt coating reaction, thereby forming an upper coating layer composed of Co- and Mg-containing ferrite having a spinel structure on the surface of the lower coating layer composed of Co-containing ferrite having a spinel structure, which is formed on the surface of each acicular magnetite particle.

In a fourth aspect of the present invention, there is provided a process for producing Co-coated acicular magnetite particles comprising the steps of:

heating and stirring a suspension obtained by adding an aqueous alkali hydroxide solution, an aqueous solution of a cobalt salt and an aqueous solution of a ferrous salt to an aqueous dispersion of acicular magnetite particles;

adding an aqueous solution of a magnesium salt to said suspension in the process of the cobalt coating reaction; and continuing to heat and stir the resulting mixture so as to complete said cobalt coating reaction, thereby forming an upper coating layer composed of Co- and Mg-containing ferrite having a spinel structure on the surface of the lower coating layer composed of Co-containing ferrite having a spinel structure, which is formed on the surface of each acicular magnetite particle.

DETAILED DESCRIPTION OF THE INVENTION

Co-coated acicular magnetite particles according to the present invention will first be explained.

In each Co-coated acicular magnetite particle of the present invention, the lower coating layer composed of Co-containing ferrite having a spinel structure (spinel ferrite containing cobalt), which is formed on the surface of acicular magnetite particle as the core particle has a thickness of 4 to 50 Å. If the thickness of the lower coating layer is less than 4 Å, the coercive force may not be sufficiently enhanced. On the other hand, if the thickness exceeds 50 Å, the amount of cobalt may increase, which is not economic. The upper coating layer of Co- and Mg-containing ferrite having a spinel structure (spinel ferrite containing cobalt and magnesium) has a thickness of 2 to 20 Å. If the thickness of the upper coating layer is less than 2 Å, the effect intended in the present invention may not be obtained. On the other hand, if the thickness exceeds 20 Å, the saturation magnetization is unfavorably lowered.

The Co-coated acicular magnetite particles according to the present invention have an aspect ratio (major axial diameter/minor axial diameter) of not less than 4. Preferable Co-coated acicular magnetite particles according to the present invention have a major axial diameter of 0.05 to 0.4 μm and a large aspect ratio (major axial diameter/minor axial diameter), especially, an aspect ratio of not less than 5. More preferable Co-coated acicular magnetite particles according to the present invention have a major axial diameter of 0.05 to 0.3 μm and an aspect ratio (major axial diameter/minor axial diameter) of not less than 7.

The Co-coated acicular magnetite particles of the present invention contain 10 to 24 wt % of $Fe^{2+}$. If the black chromaticity is taken into consideration, Co-coated acicular magnetite particles containing 13 to 24 wt % of $Fe^{2+}$ is preferable. The Co-coated acicular magnetite particles of the present invention also contain 0.1 to 10 wt % of cobalt (calculated as Co). If the Co content is less than 0.1 wt %, the sufficient coercive force may not be obtained. If the Co content exceeds 10 wt %, it is unfavorable from the point of view of economy. The Co-coated acicular magnetite particles also contain 0.2 to 3.5 wt % of magnesium (calculated as Mg). If the Mg content is less than 0.2 wt %, the effect intended in the present invention may not be obtained. On the other hand, if the Mg content exceeds 3.5 wt %, the saturation magnetization may be unfavorably lowered.

The coercive force of the Co-coated acicular magnetite particles of the present invention is 580 to 900 Oe, preferably 600 to 850 Oe. The saturation magnetization is 77 to 90 emu/g, preferably 78 to 90 emu/g.

With respect to the chemical and magnetic stability with passage of time (chemical and magnetic temporal stability) of the Co-coated acicular magnetite particles of the present invention, the reduction ratio of $Fe^{2+}$ is not more than 51%, preferably not more than 49%, and the change of the coercive force is −10 to +5% in an accelerated stability test in which the particles are permitted to stand for 14 days in the environment of a temperature of 60° C. and a humidity of 90%.

Each Co-coated acicular magnetite particle of the present invention may has as an uppermost coating layer, at least one layer composed of a compound containing at least one element selected from the group consisting of Si and Al.

The thickness of the uppermost coating layer is not more than 20 Å, preferably 2 to 20 Å. If the thickness exceeds 20

Å, the saturation magnetization of the Co-coated acicular magnetite particles obtained may be lowered.

The Si content of the Co-coated acicular magnetite particles having the uppermost coating layer according to the present invention is not more than 5 wt %, preferably 0.2 to 2 wt % of Si (calculated as $SiO_2$). The Al content of the Co-coated acicular magnetite particles having the uppermost coating layer according to the present invention is not more than 3 wt %, preferably 0.05 to 1 wt % of Al (calculated as Al).

Each Co-coated acicular magnetite particles having as an uppermost coating layer, at least one layer composed of a compound containing at least one element selected from the group consisting of Si and Al, in other words, the uppermost coating layer composed of an Si compound, an Al compound, or a compound containing Si and Al have further effects such as the prevention of the reduction of $Fe^{2+}$ content due to oxidization and stabilization of the $Fe^{2+}$ content with passage of time caused by the existence of Al compound, and the reduction of the fatty acid adsorptivity on the surface of the magnetite particles caused by the existence of Si compound.

One of processes for producing Co-coated acicular magnetite particles according to the present invention will now be explained.

For the cobalt coating reaction in the present invention, one of the already known methods may be adopted. Examples of them are a method of modifying acicular magnetite particles with Co by dispersing the acicular magnetite particles in water containing an aqueous solution of a cobalt salt, adding a caustic alkali to the resultant dispersion, raising the temperature of the dispersion to 50° to 100° C., and maintaining the dispersion at that temperature, and a method of modifying acicular magnetite particles with a ferrous salt and cobalt by dispersing the acicular magnetite particles in an aqueous mixed solution of a ferrous salt and a cobalt salt, adding a caustic alkali to the resultant dispersion, raising the temperature of the dispersion to 50° to 100° C., and maintaining the dispersion at that temperature.

In the cobalt coating reaction of the present invention, the temperature of the dispersion is raised to 50° C. and the stirring of the dispersion is further continued so as to produce spinel ferrite containing cobalt on the surfaces of the acicular magnetite particles. The upper limit of the temperature is the boiling point, preferably 90° C. to the boiling point.

If the temperature is lower than 50° C., the cobalt coating reaction becomes greatly slow and sufficient magnetic characteristics are not obtained. Even if the temperature exceeds the boiling point, the cobalt coating reaction is possible, but in that case, a special apparatus such as an autoclave is required, so that it is preferable from the industrial point of view to set the upper limit of the temperature to the boiling point.

As the acicular magnetite particles used in the present invention are usable acicular magnetite particles produced from acicular hematite particles as an intermediate material obtained by using acicular goethite particles as a starting material which are obtained by oxidizing, in a wet process, a suspension of a neutral precipitate produced by mixing an aqueous solution of a ferrous salt and an alkali hydroxide or an aqueous alkali carbonate; or acicular magnetite particles using not acicular goethite particles but directly synthesized acicular hematite particles in a wet process as a starting material. The acicular magnetite particles produced from acicular berthoride particles as an intermediate material may also be used.

The acicular magnetite particles used in the present invention contain about 10 to 24 wt % of ferrous iron. With due consideration of black chromaticity, acicular magnetite particles containing 13 to 24 wt % of ferrous iron are preferable.

The acicular magnetite particles used as core particles in the present invention have an aspect ratio (major axial diameter/minor axial diameter) of not less than 4, and they may have not only an acicular shape but also a spindle shape, a strip shape, a rice-type shape or the like. Preferable acicular magnetite particles in the present invention have a major axial diameter of 0.05 to 0.4 μm and a large aspect ratio (major axial diameter/minor axial diameter), especially, an aspect ratio of not less than 5. More preferable acicular magnetite particles have a major axial diameter of 0.05 to 0.3 μm and an aspect ratio (major axial diameter/minor axial diameter) of not less than 7.

It is possible to use acicular magnetite particles containing at least one element selected from the group consisting of Ni, Si, Al, Zn, P, Ba, Sr, Ca, and Pb.

The coercive force of the acicular magnetite particles used as core particles in the present invention is 300 to 450 Oe and the saturation magnetization thereof is 70 to 90 emu/g. Acicular magnetite particles having a coercive force of 350 to 450 Oe and a saturation magnetization of 75 to 87 emu/g are preferable.

The concentration of a water dispersion of the acicular magnetite particles used in the present invention is 20 to 1000 g/liter. A dispersion having a low concentration on the order of less than 20 g/liter is unfavorable in the productivity. On the other hand, if the concentration of the dispersion exceeds 1000 g/liter, the uniform cobalt coating reaction cannot be expected.

As an aqueous alkali hydroxide used in the present invention, an aqueous sodium hydroxide, an aqueous potassium hydroxide, ammonia water, etc. are usable. The OH-group concentration after adding the aqueous alkali hydroxide solution is preferably 0.05 to 3.0 mol/liter. If the OH-group concentration is less than 0.05 mol/liter, the cobalt coating reaction may be insufficient. If the OH-group concentration exceeds 3.0 mol/liter, cobalt hydroxide may unfavorably start to dissolve.

As an aqueous solution of a ferrous salt used in the present invention, an aqueous ferrous sulfate and an aqueous ferrous chloride are usable. The amount of aqueous solution of a ferrous salt added is not more than 15 wt % (calculated as $Fe^{2+}$) based on the acicular magnetite particles. If the amount exceeds 15 wt %, the coercive force distribution of the Co-coated acicular magnetite particles obtained becomes too large. In order to reduce the electric resistance of the Co-coated acicular magnetite particles, the preferable amount of the aqueous solution of ferrous salt added 0.5 to 15 wt % (calculated as Fe2+) based on the acicular magnetite particles.

As the aqueous solution of a cobalt salt in the present invention, aqueous cobalt sulfate, aqueous cobalt chloride, aqueous cobalt nitrate and the like are usable. The amount of aqueous solution of a cobalt salt added is more than 0.1 wt %, preferably not less than 0.5 wt % (calculated as Co) based on the acicular magnetite particles. In order to obtain a high coercive force, a large amount of cobalt salt may be added without specific limitation. However, addition of not more than 10.0 wt % of cobalt salt is generally sufficient.

The order of adding the aqueous alkali hydroxide solution, the aqueous solution of a ferrous salt and the aqueous solution of a cobalt salt may be selected as desired or they may be added simultaneously.

As the aqueous solution of a magnesium salt used in the present invention, aqueous magnesium sulfate, aqueous magnesium chloride, aqueous magnesium nitrate and the like are usable.

The amount of aqueous solution of a magnesium salt added is 0.27 to 4.5 wt %, preferably 0.3 to 4.0 wt % (calculated as Mg) based on the acicular magnetite particles. If it is less than 0.27 wt %, the effect intended in the present invention cannot be obtained. If it exceeds 4.5 wt %, since spinel ferrite containing magnesium, which has a relatively smaller saturation magnetization than magnetite as the core material or spinel ferrite containing cobalt as the lower coating layer material, the saturation magnetization of the Co-coated acicular magnetite particles decreases as a whole, which is not suitable for practical use.

The aqueous solution of a magnesium salt in the present invention is added in the process of the cobalt coating reaction for forming as the lower coating layer spinel ferrite containing Co on the surfaces of the acicular magnetite particles. To state this more concretely, the aqueous solution of a magnesium salt is added while the coercive force Hc in the process of the cobalt coating reaction when an aqueous solution of a magnesium salt is not added, is in the following range:

$$0.9 \leq Hc/Hc_m < 1.0$$

(wherein $Hc_m$ is the coercive force at the end of the cobalt coating reaction).

This calculation is conducted as follows.

A cobalt coating reaction for forming spinel ferrite containing cobalt is carried out without adding magnesium in the same way as in a conventional process, as shown in Comparative Example 1 which will be described later, and a change of the coercive force with passage of reaction time is examined by sampling and inspection at regular intervals of time. The period during which the coercive force Hc is in the above-described range is calculated in advance. Thereafter, the cobalt coating reaction is carried out in the same manner, and an aqueous solution of a magnesium salt is added within the calculated period.

When an aqueous solution of a magnesium salt is added in the early stage of the cobalt coating reaction in which $Hc/Hc_m$ is less than 0.9, since magnesium which has a higher ionization degree than cobalt, preferentially deposit on the surface of each acicular magnetite particle, the $Co(OH)_2$ produced remains even after the cobalt coating reaction and cobalt ferrite coating layer are not formed on the surface of each acicular magnetite particle. It is, therefore, impossible to obtain a sufficient coercive force. If magnesium is added immediately after the completion of the cobalt coating reaction when $Hc/HC_m$ is 1.0, since spinel ferrite coating layer containing magnesium and cobalt are not formed on the surface of each Co-coated acicular magnetite particle, the desired effect cannot be obtained.

The atmosphere for each addition and stirring for producing spinel ferrite coating layer containing cobalt and spinel ferrite coating layer containing magnesium may be either an oxidizing atmosphere or a non-oxidizing atmosphere, but a non-oxidizing atmosphere is preferable, because a change of the coercive force with passage of reaction time is comparatively gradual and the period for adding magnesium is easy to specify in a non-oxidizing atmosphere.

As the non-oxidizing atmosphere, a flow of an inert gas such as $N_2$ gas and Ar gas is preferable.

As the Si compound and Al compound for forming the uppermost coating layer, the following compounds are usable.

As the Si compound, water glass, colloidal silica, sodium silicate, potassium silicate, calcium silicate, silicon dioxide and the like are usable. The amount of Si compound added is 0.01 to 5.0 wt % (calculated as $SiO_2$) based on the Co-coated acicular magnetite particles.

As the Al compound, an aluminum salt such as aluminum sulfate, aluminum chloride, aluminum nitrate and aluminum acetate, an alkali aluminate such as sodium aluminate and potassium aluminate, aluminum hydroxide, aluminum oxide, alumina sol, aluminum oxalate and the like are usable. The amount of Al compound added is 0.01 to 3.0 wt % (calculated as Al) based on the Co-coated acicular magnetite particles.

The suspension containing the Co-coated acicular magnetite particles each comprising as core particle, an acicular magnetite particle, a lower coating layer composed of Co-containing ferrite having a spinel structure and formed on the surface of the acicular magnetite particle, and an upper coating layer composed of Co- and Mg-containing ferrite having a spinel structure and formed on the lower coating layer may be used (1) as it is, or (2) after filtering the suspension, washing with water or washing by decantation, and dispersing in water again.

Si and Al may be added to such suspension under stirring at a temperature of 50° to 100° C. at a time, in several portions, or continuously in small quantities. The pH is adjusted, if necessary, with an acid or an alkali before and/or after the addition of Si and Al. Si and Al may be added either sequentially or simultaneously. If they are added sequentially, the pH may be adjusted by an acid or an alkali between the additions. By the above-mentioned process, at least one layer comprising a compound composed of an element(s) selected from the group consisting of Si, Al and both of Si and Al is formed, as an uppermost layer, on the surface of the upper coating layer of Co-coated acicular magnetite particle. Such compound is hydroxides, oxides or hydrates containing Si and/or Al.

It is known, as described above, that although Co-coated acicular magnetite particles have an excellent black chromaticity due to the existence of not less than a predetermined amount of $Fe^{2+}$, there is a problem in the chemical and magnetic temporal stability. The activity of the particles is high due to the large amount of $Fe^{2+}$ and $Fe^{2+}$ is oxidized into $Fe^{3+}$ by the oxygen in the air with passage of time, which is called as a chemical deterioration with passage of time. Due to the oxidization of $Fe^{2+}$, the cobalt ions move by way of the vacancies in a crystal lattice, thereby changing the coercive force with passage of time, which is called as a magnetic deterioration with passage of time.

An example of a conventionally known method for producing magnetic iron oxide particles having an excellent chemical and magnetic temporal stability from acicular magnetite particles having such a high activity is a method of surface-treating the acicular magnetite particles with water glass or a hydroxide of aluminum. This method is, however, only physical absorption such as electrical absorption, and there is a possibility of causing desorption. It is considered that if spinel ferrite upper coating layer having the same crystalline structure as magnetite and cobalt ferrite were formed on the surface of the cobalt ferrite lower coating layer which were formed on the surfaces of the acicular magnetite particles, it would constitute stable coatings. Accordingly, the experiments with various types of aqueous solution of a metal salt which were considered to form spinel ferrite were carried out in order to improve the chemical and magnetic temporal stability by the formation of spinel ferrite coating layer.

As a result of investigation by using various metal salts, it has been found that addition of an aqueous solution of a magnesium salt in a specific period of time produces an excellent effect on the chemical and magnetic temporal stability.

When an aqueous solution of a magnesium salt is added (1) to the aqueous dispersion of acicular magnetite particles simultaneously with the addition of an aqueous solution of a cobalt salt and an aqueous solution of a ferrous salt, (2) to the suspension after the addition of an aqueous solution of a cobalt salt and before the addition of an aqueous solution of a ferrous salt, or (3) to the suspension in the early stage of the cobalt coating reaction, since magnesium which has a higher ionization degree than cobalt preferentially deposits on the surface of each acicular magnetite particle in any case (1), (2) or (3), much of the hydroxide of cobalt remains even after the cobalt coating reaction, which makes it impossible to obtain a sufficient coercive force. On the other hand, if an aqueous solution of a magnesium salt is added to the suspension after the end of the cobalt coating reaction, since approximately all the cobalt ions and $Fe^{2+}$ ions in the solution have already been consumed, it is impossible to form spinel ferrite containing magnesium on the surface of each particles, so that the magnesium is considered to exist in the form of a hydroxide of magnesium. When the suspension is filtered and the deposit is washed with water to obtain a cake, the hydroxide of magnesium dissolves again with a reduction in the pH during washing, and there is little hydroxide of magnesium remaining on the surface of each particles, so that the effect intended in the present invention cannot be obtained.

It is not clear in detail how the spinel ferrite coating containing magnesium obtained in the above-described methods acts on the chemical and magnetic temporal stability. Use of manganese or zinc which can form a spinel ferrite upper coating layer having the same crystalline structure, cannot produce a sufficient chemical and magnetic temporal stability, even if a spinel ferrite upper coating layer is formed, as shown in Comparative Examples which will be described later. From this fact, it is considered that a spinel ferrite upper coating layer containing magnesium suppresses the oxidization of $Fe^{2+}$ by the oxygen in the air as compared with a spinel ferrite coating layer containing manganese or zinc, so that the movement of cobalt ions by way of the vacancies is suppressed, thereby improving the temporal stability of the coercive force, which leads to effective magnetic temporal stability.

The Co-coated acicular magnetite particles according to the present invention have a high coercive force, a large saturation magnetization, an excellent black chromaticity and an excellent chemical and magnetic temporal stability, as described in Examples which will be described later, and hence, they are suitable as magnetic oxide particles for high-density recording media.

EXAMPLES

The present invention will be explained in more detail while referring to the following non-limitative examples and comparative examples.

(1) The major axial diameter and the aspect ratio (major axial diameter/minor axial diameter) of the particles in each of the following examples and comparative examples are expressed by the average values measured in electron microphotographs, and the specific surface area was measured by a BET method using nitrogen gas by using "Mono Sorb MS-11" (manufactured by Kanta Chlomu Co., Ltd.).

(2) The magnetic characteristics of the Co-coated acicular magnetite particles were measured under an external magnetic field of 10 KOe by Vibration Sample Magnetometer VSM-3S-15 (manufactured by Toei Kogyo Co., Ltd.).

(3) The Co content in the particles was measured by the fluorescent X-ray analysis, JIS K0119 by "Fluorescent X-ray Analyzer 3063M" (manufactured by Rigaku Denki Kogyo Co., Ltd.), and the Mg content was measured by a high-frequency plasma emission spectrophotometer (manufactured by Nihon Jarrel Ash Co., Ltd.).

(4) With respect to the black chromaticity, the color of the particles was measured by a color-difference meter (manufactured by Suga Shikenki Co., Ltd.), the color specification numbers $L^*$, $a^*$ and $b^*$ were measured in accordance with JIS Z8729, and the black chromaticity was evaluated by the lightness $L^*$.

(5) Change in the coercive force, the $Fe^{2+}$ content and the color specification numbers $L^*$, $a^*$ and $b^*$ with passage of time were represented by the values measured after the particles were permitted to stand at an air temperature of 60° C. and a humidity of 90% for 14 days.

(6) The thickness of the spinel ferrite lower coating layer containing cobalt and the thickness of the spinel ferrite upper coating layer containing cobalt and magnesium were indirectly calculated by measuring the X-ray particle diameter. The X-ray particle diameter was measured as a size of the crystal grain by X-ray diffractometry and a thickness in the direction perpendicular to the crystal face was calculated using the measured values from the following Scherrer formula:

$$D = K\lambda/\beta \cos\theta$$

wherein $\beta$ is the half-width of the real diffraction peak (radian unit) obtained by correcting the machine width of the apparatus, K is a Scherrer constant (0.9), $\lambda$ is the wavelength of X-ray (1.935 Å) and $\theta$ is a diffraction angle.

In calculating the thickness of a coating layer, the slurry containing the magnetic iron oxide particles coated with the lower coating layer composed of spinel ferrite containing cobalt was first extracted immediately before the addition of an aqueous solution of a magnesium salt in the process of the cobalt coating reaction, and the size of the crystal grain of all the particles was measured by the X-ray diffractometry. A slurry containing the magnetic iron oxide particles each coated with the upper coating layer composed of spinel ferrite containing cobalt and magnesium after the addition of the aqueous solution of a magnesium salt and after the end of the cobalt coating reaction was obtained, and the size of the crystal grain of all the particles were measured by the X-ray diffractometry. It is possible to estimate the thickness of the lower coating layer or the upper coating layer from the difference between the size of the crystal grain of the core particles which was measured in advance and that of the lower coating layer or the upper coating layer.

Prior to the reaction of each example and comparative example, the same cobalt coating reaction was carried out as in the reaction of each example and comparative example except for omitting the addition of a magnesium salt, and a change of the coercive force with passage of reaction time was examined by sampling and inspection at regular intervals of time. The period during which the coercive force Hc in the process of the reaction is in the following range with respect to the coercive force $HC_m$ after the end of the reaction was calculated in advance:

$0.9 \leq Hc/Hc_m < 1.0$.

(7) The thickness of the lower coating layer composed of spinel ferrite containing cobalt and the thickness of the upper coating layer composed of spinel ferrite containing cobalt and magnesium of the Co-coated acicular magnetite particles were measured by ESCA analysis (X-ray photoelectron spectroscopy) using an X-ray photoelectron spectral analyzer ESCA-850 (manufactured by Shimazu Seisakusho, Ltd.).

Etching was conducted in the direction of depth from the surfaces of the Co-coated acicular magnetite particles and the Mg content was measured by ESCA analysis. These operations were repeated several times and the obtained values were plotted as the relationship of Mg content and the depth from the surface on the graph. In the curve obtained from the protted points, the inflexion point in which the finite difference became zero, was determined. The thickness of the Co- and Mg-containing spinel ferrite upper coating layer was expressed from this inflexion point.

Further, etching was conducted and the Co content was measured by ESCA analysis. This operation was repeated several times and the obtained values were plotted as the relationship of Co content and the depth from the surface on the graph. In the curve obtained from the protted points, the inflexion point in which the finite difference became zero, was determined. The thickness of the Co-containing spinel ferrite lower coating layer was expressed from this inflexion point.

Each test piece used for ESCA analysis was obtained by producing a tablet by press-molding the Co-coated acicular magnetite particles by an infrared analysis tablet molding machine and cutting the tablet into a discal piece of 7 to 8 mm in diameter with a cutter. The test piece was etched by a high-speed ion etching apparatus HSE-800 (manufactured by Shimazu Seisakusho, Ltd.). The depth of etching was determined on the basis of the depth of etching of a metal Cr under the same conditions.

(8) The fatty acid (myristic acid) adsorptivity was measured in the following manner.

The 4-wt % tetrahydrofuran solution of myristic acid was added to 9.0 g of acicular magnetic iron particles by the amount calculated from the following formula:

The amount (g) of myristic acid added=$(S \times 45)/(26.3 \times 4)$ wherein S is the BET specific surface area (m$^2$/g) of the acicular iron oxide particles.

Tetrahydrofuran was then added thereto, so that the total of the myristic acid and tetrahydrofuran was 45 g. 100 g of glass beads were then added and the mixture was dispersed by a paint conditioner (manufactured by Red Devil Corp.) for 1 hour.

The suspension of the acicular magnetic iron oxide particles was fractionated in an appropriate amount and centrifugalized by a centrifugal separator H-200 (manufactured by Kokusan Enshinki Co., Ltd.) at 10000 rpm for 15 minutes. The supernatant was fractionated by using a whole pipette and the concentration of myristic acid was measured by liquid chromatography (manufactured by Shimazu Seisakusho, Ltd.) The fatty acid adsorptivity of the acicular magnetic iron oxide particles was calculated from the following formula:

Fatty acid adsorptivity (mg/g)=$[(X-Y) \times 45 \times 10]/9$

X: initial concentration [=4×myristic acid added)/45] (wt %)

Y: concentration after adsorption (wt %)

Example 1

Acicular magnetite particles having an average major axial diameter of 0.24 μm, an aspect ratio (major axial diameter/minor axial diameter) of 7.0, a BET specific surface area of 30.2 m$^2$/g, an $Fe^{2+}$ content of 17.5 wt %, a coercive force of 391 Oe and a saturation magnetization of 83.7 emu/g were used as precursor particles. A dispersion obtained by dispersing 4000 g of the precursor particles in 55.0 liter of water was mixed with 4410 ml of 18-N aqueous sodium hydroxide solution, and thereafter with 3340 ml of an aqueous ferrous sulfate containing 1.50 mol/liter of $Fe^{2+}$. The mixture was stirred for 10 minutes. Thereafter 905 ml of an aqueous cobalt sulfate containing 1.50 mol/liter of Co was added, and 30 minutes after the addition, the mixture was heated up to 100° C. so as to carry out a cobalt coating reaction while preventing air from mixing therewith. 3 hours after the beginning of the cobalt coating reaction, 825 ml of an aqueous magnesium sulfate containing of 1.0 mol/liter of Mg was added, and the cobalt coating reaction was further continued for 1 hour. As a result, a lower coating layer of spinel ferrite containing cobalt was formed on the surface of the acicular magnetite particle, and an upper coating layer of spinel ferrite containing cobalt and magnesium was formed on the lower coating layer. The black precipitate produced was cooled to room temperature, filtered out, washed with water and dried to obtain Co-coated acicular magnetite particles.

The thus-obtained Co-coated acicular magnetite particles had an average major axial diameter of 0.24 μm, an aspect ratio (major axial diameter/minor axial diameter) of 6.9, a BET specific surface area of 34.3 m$^2$/g, an $Fe^{2+}$ content of 16.77 wt %, a coercive force of 703 Oe and a saturation magnetization of 82.3 emu/g. With respect to a change in the coercive force and the $Fe^{2+}$ content after the Co-coated acicular magnetite particles were permitted to stand at a temperature of 60° C. and a humidity of 90% for 14 days, the change of the coercive force was −1.7%, and the reduction ratio of the $Fe^{2+}$ content was 38.4%.

The size of the acicular magnetite particle which was the core particle before the cobalt coating reaction, was 281 Å; the size of the particle just before the addition of the magnesium salt was 305 Å; and the size of the Co-coated acicular magnetite particle obtained after the reaction was 313 Å. From this fact, if it is considered that the coating layer grows in the perpendicular direction relative to the major axial direction of the acicular particle, the thickness of the Co-containing spinel ferrite lower coating layer which first grew on the surfaces of the acicular magnetite particle which was the core particle, was about 12 Å, and the thickness of the Co- and Mg-containing spinel ferrite upper coating layer which grew on the lower coating layer was about 4 Å.

As a result of the thickness of the lower coating layer and the upper coating layer measured by ESCA analysis method, it was confirmed that the thickness of the Co-containing spinel ferrite lower coating layer was 12 Å and the thickness of the Co- and Mg-containing spinel ferrite upper coating layer was 6 Å.

Examples 2 to 6, Comparative Examples 1 to 7

Co-coated acicular magnetite particles were obtained in the same procedure as in Example 1 except for varying the kinds of acicular magnetite particles as the core particles, the amount of aqueous solution of a cobalt salt added, the amount of aqueous solution of a ferrous salt added, the kinds and the amount of aqueous solution of a magnesium salt added, and the time at which an aqueous solution of a magnesium salt was added.

Comparative Example 8

Co-coated acicular magnetite particles were obtained in the same procedure as in Example 1 except that manganese sulfate was used as a manganese salt in place of a magnesium salt, 364 ml of an aqueous manganese sulfate having an Mn content of 1.0 mol/liter was added 3 hours after the beginning of the coating reaction and thereafter the cobalt coating reaction was further continued for 2 hours.

The main conditions for carrying out the cobalt coating reaction and adding a magnesium salt in the above Examples and Comparative Examples are shown in Tables 1 and 2, and the properties of the Co-coated acicular magnetite particles produced are shown in Table 3. Changes in the properties with passage of time are shown in Table 4 and changes of the color with passage of time measured by colorimetry are shown in Table 5.

When Examples 1 to 6 are compared with Comparative Examples 1 to 4, in Examples 1 to 6, in which the amount of magnesium salt added is in a preferable range, the changes of the properties with passage of time are permissible. On the other hand, in Comparative Examples 1 and 4, in which no magnesium salt was added, the coercive force and the $Fe^{2+}$ content were greatly changed. In Comparative Example 2, in which the amount of magnesium salt added is insufficient, the temporal stability was not improved. In Comparative Example 3, in which excess of magnesium salt was added, the saturation magnetization was lowered and the temporal stability-improving effect was not sufficient.

With respect to the timing when a magnesium salt was added, in Comparative Example 5, in which a magnesium salt was added immediately after the rise of the temperature, a sufficient coercive force was not obtained. In Comparative Example 7, in which a magnesium salt was added after the end of the cobalt coating reaction, the magnesium salt added formed a hydroxide thereof, but it dissolves again when the obtained precipitate was washed with water. Therefore the amount of remaining magnesium is insufficient, and it was impossible to obtain an expected effect on a change of the coercive force or the $Fe^{2+}$ content with passage of time.

In Comparative Example 6, in which a strontium salt was added in the process of the cobalt coating reaction, the temporal stability improving effect was not sufficient. In Comparative Example 8, in which a manganese salt was added in place of a magnesium salt, the temporal stability was little improved.

As is clear from Table 5, in Examples 1 and 3, in which a magnesium salt was added, a change (ΔL*) of the lightness L*, which is an indication of the black chromaticity, with passage of time is small, so that the predetermined black chromaticity was kept. It is obvious from this fact that the Co-coated acicular magnetite particles with a magnesium salt added thereto can keep the black chromaticity better than Co-coated acicular magnetite particles containing no magnesium.

In Examples 1 and 3, the lightness L* immediately after the production is lower than that in Comparative Example 1. In other words, there is a tendency that Co-coated acicular magnetite particles with a magnesium salt added thereto has a higher black chromaticity.

Example 7

Ten liters of an alkaline suspension (solid content: 500 g) containing the Co-coated acicular magnetite particles after the cobalt coating reaction for forming Co- and Mg-containing spinel ferrite coating layer in Example 1 was washed with water by decantation, and the obtained suspension having a pH of 11.5 was heated to at a temperature of 60° C. Thereafter, 15.5 g (corresponding to 0.9 wt % (calculated as $SiO_2$) based on the Co-coated acicular magnetite particles) of water glass #3 (Si content corresponds to 29.0 wt % calculated as $SiO_2$) was added as sodium silicate to the resultant suspension under stirring. After the pH of the suspension was adjusted to 8.5 by adding dilute acetic acid thereto, thereby forming as an uppermost layer $SiO_2$ layer. The suspension was filtered and the precipitate was washed with water and dried by an ordinary method to obtain Co-coated acicular magnetite particles with $SiO_2$ layer deposited on each surface thereof.

The Si content existing on the surface of each Co-coated acicular magnetite particle obtained was 0.65 wt % (calculated as $SiO_2$) as a result of fluorescent X-ray analysis.

The myristic acid adsorptivity of the obtained Co-coated acicular magnetite particles surface-treated with Si was 16.5 mg/g. For reference, the myristic acid adsorptivity of the Co-coated acicular magnetite particles before conducting the surface treatment with Si was 27.0 mg/g.

Examples 8 to 9

Co-coated acicular magnetite particles surface-treated with Si were obtained in the same procedure as in Example 7 except for varying the kinds and the amount of an Si compound, the pH of the suspension before the addition of an Si compound, and the adjusted pH.

The main producing conditions and the properties of the particles obtained are shown in Tables 6 to 8.

Example 10

Ten liters of an alkaline suspension (solid content: 500 g) containing the Co-coated acicular magnetite particles after the cobalt coating reaction for forming Co- and Mg-containing spinel ferrite coating layer in Example 1 was washed with water by decantation, and the obtained suspension having a pH of 11.5 was heated to a temperature of 60° C. Thereafter, 4.6 g (corresponds to 0.3 wt % (calculated as Al) based on the Co-coated acicular magnetite particles) of sodium aluminate (Al content is 32.9 wt % calculated as Al) was added to the suspension under stirring. After the pH of the suspension was adjusted to 9.0 by adding dilute acetic acid thereto, thereby forming as uppermost layer, an aluminum hydroxide layer. The suspension was filtered and the precipitate was washed with water and dried by an ordinary method to obtain Co-coated acicular magnetite particles with aluminum hydroxide layer deposited on each surface thereof.

The Al content existing on the surface of each Co-coated acicular magnetite particle obtained was 0.29 wt % (calculated as Al) as a result of fluorescent X-ray analysis.

Examples 11 to 12

Co-coated acicular magnetite particles surface-treated with Al were obtained in the same procedure as in Example 10 except for varying the type and the amount of an Al compound, the pH of the suspension before the addition of an Al compound, and the adjusted pH.

The main producing conditions and the properties of the particles obtained are shown in Tables 6 to 8.

Example 13

Ten liters of an alkaline suspension (solid content: 500 g) containing the Co-coated acicular magnetite particles after the cobalt coating reaction for forming the Co- and Mg-containing spinel ferrite coating layer in Example 1 was washed with water by decantation. The temperature of the thus-obtained alkaline suspension of pH 12.5 was raised to 60° C. Thereafter, 15.5 g (corresponding to 0.9 wt % (calculated as $SiO_2$) based on the Co-coated acicular magnetite particles) of water glass #3 (Si content corresponds to 29.0 wt % calculated as $SiO_2$) as sodium silicate, and 7.6 g (corresponds to 0.5 wt % (calculated as Al) based on the Co-coated acicular magnetite particles) of sodium aluminate (Al content is 32.9 wt % calculated as Al) were added to the suspension under stirring. The pH of the suspension was adjusted to 8.5 by adding dilute acetic acid thereto, and Co-coated acicular magnetite particles having a coprecipitate of Si and Al on each surface thereof were produced. The product was filtered out, washed with water and dried by an ordinary method.

The Si content existing on the surface of each Co-coated acicular magnetite particle obtained was 0.72 wt % (calculated as $SiO_2$) as a result of fluorescent X-ray analysis. The Al content was 0.48 wt % (calculated as Al) as a result of fluorescent X-ray analysis.

Example 14

Co-coated acicular magnetite particles were obtained in the same procedure as in Example 13 except for varying the kinds and the amounts of Si compound and Al compound, the pH of the suspension before the addition of an Si compound and an Al compound, and the adjusted pH.

The main producing conditions and the properties of the particles obtained are shown in Tables 6 to 8.

Example 15

The pH 13.5 of an alkaline suspension (10 liter) (solid content: 500 g) containing the Co-coated acicular magnetite particles after the cobalt coating reaction for forming the Co- and Mg-containing spinel ferrite coating layer in Example 1 was adjusted to 11.5 by adding dilute acetic acid thereto while maintaining the suspension at a temperature of 60° C.

Thereafter, 8.6 g (corresponding to 0.5 wt % (calculated as $SiO_2$) based on the Co-coated acicular magnetite particles) of water glass #3 (Si content corresponds to 29.0 wt % calculated as $SiO_2$) was added as sodium silicate to the suspension under stirring. The pH of the suspension was adjusted to 9.5 by adding dilute acetic acid thereto and $SiO_2$ layer was formed thereon. Under stirring, 1.5 g (corresponds to 0.1 wt % (calculated as Al) based on the acicular magnetite particles) of sodium aluminate (Al content is 32.9 wt % calculated as Al) were added to the resultant suspension. The pH of the suspension was adjusted to 8.5 by adding dilute acetic acid thereto under stirring. In this manner, Co-coated acicular magnetite particles with $SiO_2$ deposited as a first uppermost layer and aluminum hydroxide deposited as a second uppermost layer on each surface thereof were produced. The product was filtered out, washed with water and dried by an ordinary method.

The Si content existing on the surface of each Co-coated acicular magnetite particle obtained was 0.40 wt % (calculated as $SiO_2$) as a result of fluorescent X-ray analysis. The Al content was 0.09 wt % (calculated as Al) as a result of fluorescent X-ray analysis.

TABLE 1

| | Magnetite particles as core particles | | |
|---|---|---|---|
| | Major axial diameter (μm) | Aspect ratio | $Fe^{2+}$ content (wt %) |
| Examples 1 | 0.24 | 7.0 | 17.5 |
| Examples 2 | 0.24 | 7.0 | 17.5 |
| Examples 3 | 0.24 | 7.0 | 17.5 |
| Examples 4 | 0.24 | 7.0 | 17.5 |
| Examples 5 | 0.27 | 7.5 | 16.7 |
| Examples 6 | 0.27 | 7.5 | 16.7 |
| Comp. Examples 1 | 0.24 | 7.0 | 17.5 |
| Comp. Examples 2 | 0.24 | 7.0 | 17.5 |
| Comp. Examples 3 | 0.27 | 7.5 | 16.7 |
| Comp. Examples 4 | 0.27 | 7.5 | 17.5 |
| Comp. Examples 5 | 0.24 | 7.0 | 17.5 |
| Comp. Examples 6 | 0.24 | 7.0 | 17.5 |
| Comp. Examples 7 | 0.27 | 7.5 | 16.7 |
| Comp. Examples 8 | 0.24 | 7.0 | 17.5 |

| | Magnetite particles as core particles | | |
|---|---|---|---|
| | Specific surface area ($m^2/g$) | Coercive force (Oe) | Saturation magnetization (emu/g) |
| Examples 1 | 30.2 | 391 | 83.7 |
| Examples 2 | 30.2 | 391 | 83.7 |
| Examples 3 | 30.2 | 391 | 83.7 |
| Examples 4 | 30.2 | 391 | 83.7 |
| Examples 5 | 29.7 | 385 | 82.4 |
| Examples 6 | 29.7 | 385 | 82.4 |
| Comp. Examples 1 | 30.2 | 391 | 83.7 |
| Comp. Examples 2 | 30.2 | 391 | 83.7 |
| Comp. Examples 3 | 29.7 | 385 | 82.4 |
| Comp. Examples 4 | 29.7 | 385 | 82.4 |
| Comp. Examples 5 | 30.2 | 391 | 83.7 |
| Comp. Examples 6 | 30.2 | 391 | 83.7 |
| Comp. Examples 7 | 29.7 | 385 | 82.4 |
| Comp. Examples 8 | 30.2 | 391 | 83.7 |

| | Co coating conditions | | | |
|---|---|---|---|---|
| | $OH^-$ group concentration (N) | $Fe^{2+}$ added (wt %) | Co added (wt %) | Other metal salts (wt %) |
| Examples 1 | 1.0 | 7.0 | 2.0 | — |
| Examples 2 | 1.0 | 7.0 | 2.0 | — |
| Examples 3 | 1.0 | 7.0 | 2.0 | — |
| Examples 4 | 1.0 | 7.0 | 2.0 | — |
| Examples 5 | 1.0 | 7.0 | 2.0 | — |
| Examples 6 | 1.0 | — | 3.0 | — |
| Comp. Examples 1 | 1.0 | 7.0 | 2.0 | — |
| Comp. Examples 2 | 1.0 | 7.0 | 2.0 | — |
| Comp. Examples 3 | 1.0 | 7.0 | 2.0 | — |
| Comp. Examples 4 | 1.0 | — | 3.0 | — |
| Comp. Examples | 1.0 | 7.0 | 2.0 | — |

TABLE 1-continued

| | | | | |
|---|---|---|---|---|
| Examples 5 | | | | |
| Comp. Examples 6 | 1.0 | 9.0 | 2.5 | $SrSO_4$ 1.0 |
| Comp. Examples 7 | 1.0 | 7.0 | 2.0 | — |
| Comp. Examples 8 | 1.0 | 7.0 | 2.0 | — |

TABLE 2

| | Conditions for adding Mg salt | | |
|---|---|---|---|
| | Type of Mg | Mg added (wt %) | Time for adding Mg |
| Examples 1 | $MgSO_4$ | 1.0 | 3 hrs after beginning of reaction |
| Examples 2 | $Mg(NO_3)_2$ | 0.75 | 3 hrs after beginning of reaction |
| Examples 3 | $MgSO_4$ | 0.5 | 3 hrs after beginning of reaction |
| Examples 4 | $MgSO_4$ | 0.3 | 3 hrs after beginning of reaction |
| Examples 5 | $MgSO_4$ | 3.0 | 2 hrs after beginning of reaction |
| Examples 6 | $MgSO_4$ | 0.5 | 3 hrs after beginning of reaction |
| Comp. Examples 1 | — | — | — |
| Comp. Examples 2 | $MgSO_4$ | 0.25 | 3 hrs after beginning of reaction |
| Comp. Examples 3 | $Mg(NO_3)_2$ | 5.0 | 2 hrs after beginning of reaction |
| Comp. Examples 4 | — | — | — |
| Comp. Examples 5 | $MgSO_4$ | 1.0 | Immediately after raising temperature |
| Comp. Examples 6 | $MgSO_4$ | 0.5 | 2 hrs after beginning of reaction |
| Comp. Examples 7 | $MgSO_4$ | 0.5 | After the end of reaction |
| (Comparative Example in which Mn salt was added) | | | |
| Comp. Examples 8 | $MnSO_4$ | 0.5 | 2 hrs after beginning of reaction |

| | Properties of particles when Mg was added | |
|---|---|---|
| | Hc when mg was added (Oe) | $Hc/Hc_m$ |
| Examples 1 | 716 | 0.96 |
| Examples 2 | 716 | 0.97 |
| Examples 3 | 724 | 0.99 |
| Examples 4 | 692 | 0.94 |
| Examples 5 | 737 | 0.98 |
| Examples 6 | 614 | 0.91 |
| Comp. Examples 1 | — | — |
| Comp. Examples 2 | 719 | 0.98 |
| Comp. Examples 3 | 707 | 0.96 |
| Comp. Examples 4 | — | — |
| Comp. Examples 5 | 587 | 0.78 |
| Comp. Examples 6 | 646 | 0.93 |
| Comp. Examples 7 | 710 | 1.00 |
| (Comparative Example in which Mn salt was added) | | |
| Comp. Examples 8 | 702 | 0.94 |

TABLE 3

| | Properties of particles produced | | | |
|---|---|---|---|---|
| | Coercive force (Oe) | Saturation magnetization (emu/g) | Squareness σr/σs | Specific surface area (m²/g) |
| Examples 1 | 703 | 82.3 | 0.476 | 34.3 |
| Examples 2 | 711 | 83.2 | 0.477 | 33.4 |
| Examples 3 | 715 | 83.5 | 0.480 | 33.3 |
| Examples 4 | 676 | 83.8 | 0.476 | 30.5 |
| Examples 5 | 721 | 78.9 | 0.475 | 34.6 |
| Examples 6 | 602 | 80.3 | 0.466 | 34.1 |
| Comp. Examples 1 | 699 | 81.9 | 0.480 | 35.4 |
| Comp. Examples 2 | 709 | 83.6 | 0.478 | 32.8 |
| Comp. Examples 3 | 657 | 74.8 | 0.471 | 29.8 |
| Comp. Examples 4 | 625 | 81.1 | 0.477 | 34.8 |
| Comp. Examples 5 | 643 | 83.0 | 0.475 | 32.5 |
| Comp. Examples 6 | 684 | 82.6 | 0.465 | 25.3 |
| Comp. Examples 7 | 701 | 83.4 | 0.471 | 32.5 |
| Comp. Examples 8 | 686 | 83.2 | 0.475 | 28.8 |

| | Properties of particles produced | | |
|---|---|---|---|
| | $Fe^{2+}$ (wt %) | Co (wt %) | Mg (wt %) |
| Examples 1 | 16.77 | 1.71 | 0.78 |
| Examples 2 | 16.99 | 1.73 | 0.52 |
| Examples 3 | 16.66 | 1.76 | 0.35 |
| Examples 4 | 17.09 | 1.75 | 0.25 |
| Examples 5 | 15.70 | 1.90 | 2.78 |
| Examples 6 | 14.61 | 2.78 | 0.42 |
| Comp. Examples 1 | 15.56 | 1.63 | — |
| Comp. Examples 2 | 16.31 | 1.76 | 0.16 |
| Comp. Examples 3 | 15.97 | 1.66 | 3.91 |
| Comp. Examples 4 | 14.50 | 2.78 | — |
| Comp. Examples 5 | 15.89 | 1.73 | 0.78 |
| Comp. Examples 6 | 16.01 | 2.07 | 0.34 |
| Comp. Examples 7 | 14.71 | 1.66 | 0.19 |
| Comp. Examples 8 | 16.23 | 1.73 | 0.36 |

TABLE 4

Properties of particles produced with time (After 14 days)

|  | ΔHc | | ΔFe²⁺ | |
| --- | --- | --- | --- | --- |
|  | (Oe) | ((%)) | (wt %) | (%) |
| Examples 1 | −12 | −1.7 | −6.44 | −38.4 |
| Examples 2 | −16 | −2.3 | −6.74 | −39.7 |
| Examples 3 | −38 | −5.3 | −7.06 | −42.4 |
| Examples 4 | −60 | −8.9 | −8.23 | −48.2 |
| Examples 5 | +4 | +0.6 | −6.91 | −44.0 |
| Examples 6 | +1 | +0.2 | −7.10 | −48.6 |
| Comp. Examples 1 | −117 | −16.7 | −9.10 | −58.5 |
| Comp. Examples 2 | −106 | −15.0 | −9.74 | −59.7 |
| Comp. Examples 3 | +32 | +4.9 | −8.30 | −52.0 |
| Comp. Examples 4 | −65 | −10.4 | −9.39 | −64.8 |
| Comp. Examples 5 | −48 | −7.5 | −8.79 | −55.3 |
| Comp. Examples 6 | −25 | −3.7 | −8.97 | −56.0 |
| Comp. Examples 7 | −87 | −13.8 | −8.71 | −59.2 |
| Comp. Examples 8 | −91 | −13.3 | −9.01 | −55.5 |

TABLE 5

Change in color specification numbers with passage of time

|  | L* | a* | b* |
| --- | --- | --- | --- |
| Immediately after Production | | | |
| Examples 1 | 12.2 | −0.2 | 0.42 |
| Examples 3 | 12.2 | −0.3 | 0.39 |
| Comp. Examples 1 | 12.8 | 0.03 | 0.48 |
| After 14 days | | | |
| Examples 1 | 16.2 | 0.03 | 2.48 |
| Examples 3 | 16.3 | 0.14 | 2.55 |
| Comp. Examples 1 | 18.9 | 0.46 | 3.43 |

|  | Difference | | |
| --- | --- | --- | --- |
|  | ΔL* | Δa* | Δb* |
| Examples 1 | +4.0 | +0.23 | +2.06 |
| Examples 3 | +4.1 | +0.44 | +2.16 |
| Comp. Examples 1 | +6.1 | +0.43 | +2.95 |

TABLE 6

| | Particles to be treated | Surface coating conditions Kind of additive |
| --- | --- | --- |
| Examples 7 | Co-coated magnetite in Examples 1 | Water glass #3 |
| Examples 8 | Co-coated magnetite in Examples 2 | Water glass #3 |
| Examples 9 | Co-coated magnetite in Examples 3 | Water glass #3 |
| Examples 10 | Co-coated magnetite in Examples 1 | Sodium aluminate |
| Examples 11 | Co-coated magnetite in Examples 3 | Sodium aluminate |
| Examples 12 | Co-coated magnetite in Examples 3 | Aluminum sulfate |
| Examples 13 | Co-coated magnetite in Examples 1 | Water glass #3 Sodium aluminate |
| Examples 14 | Co-coated magnetite in Examples 1 | Water glass #3 Aluminum sulfate |
| Examples 15 | Co-coated magnetite in Examples 1 | Water glass #3 Sodium aluminate |

| | Surface coating conditions | | | |
| --- | --- | --- | --- | --- |
| | Temperature before addition (°C.) | pH before addition | Amount of additive added (wt %) | Adjusted pH |
| Examples 7 | 60 | 11.5 | 0.9 | 8.5 |
| Examples 8 | 60 | 11.0 | 0.5 | 8.5 |
| Examples 9 | 60 | 11.8 | 0.3 | 9.0 |
| Examples 10 | 60 | 11.5 | 0.3 | 9.0 |
| Examples 11 | 60 | 12.0 | 0.3 | 8.5 |
| Examples 12 | 60 | 11.5 | 0.1 | 8.0 |
| Examples 13 | 60 | 12.5 | 0.9 0.5 | 8.0 |
| Examples 14 | 60 | 11.9 | 0.5 0.1 | 8.5 |
| Examples 15 | 60 | 11.5 | 0.5 0.1 | 9.5 8.5 |

TABLE 7

Properties of particles

| | Coercive force (Oe) | Saturation magnetization (emu/g) | squareness (σr/σs) | Specific surface area (m²/g) |
| --- | --- | --- | --- | --- |
| Examples 7 | 699 | 80.9 | 0.470 | 34.0 |
| Examples 8 | 710 | 82.9 | 0.476 | 32.9 |
| Examples 9 | 717 | 83.4 | 0.480 | 32.6 |
| Examples 10 | 708 | 82.0 | 0.478 | 32.0 |
| Examples 11 | 719 | 82.8 | 0.479 | 32.0 |
| Examples 12 | 715 | 83.0 | 0.481 | 33.0 |
| Examples 13 | 715 | 80.9 | 0.474 | 30.0 |
| Examples 14 | 709 | 81.4 | 0.476 | 30.9 |
| Examples 15 | 710 | 81.9 | 0.476 | 30.7 |

Properties of particles

| | Fe²⁺ content (wt %) | Co content (wt %) | Total Mg content (wt %) |
| --- | --- | --- | --- |
| Examples 7 | 16.80 | 1.70 | 0.45 |
| Examples 8 | 17.15 | 1.71 | 0.49 |
| Examples 9 | 16.75 | 1.74 | 0.28 |
| Examples 10 | 17.20 | 1.72 | 0.52 |
| Examples 11 | 17.25 | 1.73 | 0.28 |
| Examples 12 | 17.10 | 1.77 | 0.29 |
| Examples 13 | 17.35 | 1.69 | 0.55 |
| Examples 14 | 17.15 | 1.69 | 0.51 |
| Examples 15 | 17.30 | 1.70 | 0.48 |

| | Uppermost coating layer | |
| --- | --- | --- |
| | SiO₂ content (wt %) | Al content (wt %) |
| Examples 7 | 0.65 | — |
| Examples 8 | 0.28 | — |
| Examples 9 | 0.19 | — |
| Examples 10 | — | 0.29 |
| Examples 11 | — | 0.28 |
| Examples 12 | — | 0.10 |
| Examples 13 | 0.72 | 0.48 |

TABLE 7-continued

| | | |
|---|---|---|
| Examples 14 | 0.42 | 0.09 |
| Examples 15 | 0.40 | 0.09 |

TABLE 8

| | Properties of particles after 14 days | | | | Myristic acid adsorption |
|---|---|---|---|---|---|
| | ΔHc | | ΔFe$^{2+}$ | | |
| | (Oe) | (%) | (wt %) | (%) | (mg/g) |
| Examples 7 | −10 | −1.4 | −6.00 | −35.7 | 16.5 |
| Examples 8 | −18 | −2.5 | −6.58 | −38.4 | 21.5 |
| Examples 9 | −42 | −5.9 | −7.15 | −42.7 | 22.0 |
| Examples 10 | +1 | +0.1 | −5.68 | −33.0 | — |
| Examples 11 | −15 | −2.1 | −5.80 | −33.6 | — |
| Examples 12 | −30 | −4.2 | −6.50 | −39.9 | — |
| Examples 13 | +10 | +1.4 | −5.05 | −29.1 | 16.0 |
| Examples 14 | −8 | −1.1 | −6.00 | −35.0 | 19.5 |
| Examples 15 | −5 | −0.7 | −5.98 | −34.6 | 19.0 |

What is claimed is:

1. Co-coated acicular magnetite particles each comprising:

an acicular magnetite particle as the core particle;

a lower coating layer 4 to 50 Å thick of Co-containing spinel ferrite, which is formed on the surface of said acicular magnetite particle; and an upper coating layer of 2 to 20 Å thick Co- and Mg-containing spinel ferrite, which is formed on said lower coating layer, said particles having an aspect ratio (major axial diameter/minor axial diameter) of not less than 4, a coercive force of 580 to 900 Oe, a saturation magnetization of 77 to 90 emu/g, a reduction ratio of the Fe$^{2+}$ content after said Co-coated acicular magnetite particles were permitted to stand at a temperature of 60° C. and a humidity of 90% for 14 days of not more than 51%, and a change of the coercive force after said Co-coated acicular magnetite particles were permitted to stand at a temperature of 60° C. and a humidity of 90% for 14 days of −10 to +5%, the Fe$^{2+}$ content of the Co-coated acicular magnetite particles being 10 to 24 wt %, the cobalt content thereof being 0.1 to 10 wt % (calculated as Co), and the magnesium content thereof being 0.2 to 3.5 wt % (calculated as Mg).

2. Co-coated acicular magnetite particles according to claim 1, wherein the major axial diameter of the Co-coated acicular magnetite particles in 0.05 to 0.4 μm.

3. Co-coated acicular magnetite particles according to claim 1, which further have at least one uppermost coating layer composed of a compound containing at least one element selected from the group consisting of Si and Al on the surface of the upper coating layer thereof, the thickness of the uppermost coating layer being not more than 20 Å.

4. Co-coated acicular magnetite particles according to claim 3, wherein the Si content of the Co-coated acicular magnetite particles is not more than 5 wt % (calculated as SiO$_2$), and the Al content thereof is not more than 3 wt % (calculated as Al).

5. Co-coated acicular magnetite particles each comprising:

an acicular magnetite particle as the core particle;

a lower coating layer 4 to 50 Å thick of Co-containing spinel ferrite, which is formed on the surface of said acicular magnetite particle; and an upper coating layer 2 to 20 Å thick of Co- and Mg-containing spinel ferrite, which is formed on said lower coating layer, said particles having an aspect ratio (major axial diameter/minor axial diameter) of not less than 4, a coercive force of 580 to 900 Oe, a saturation magnetization of 77 to 90 emu/g, a reduction ratio of the Fe$^{2+}$ content after said Co-coated acicular magnetite particles were permitted to stand at a temperature of 60° C. and a humidity of 90% for 14 days of not more than 51%, and a change of the coercive force after said Co-coated acicular magnetite particles were permitted to stand at a temperature of 60° C. and a humidity of 90% for 14 days of −10 to +5%, the Fe$^{2+}$ content of the Co-coated acicular magnetite particles being 10 to 24 wt %, the cobalt content thereof being 0.1 to 10 wt % (calculated as Co), and the magnesium content thereof being 0.2 to 3.5 wt % (calculated as Mg), said particles obtained by a process comprising the steps of:

(1) heating and stirring a suspension obtained by adding an aqueous alkali hydroxide solution and an aqueous solution of a cobalt salt to an aqueous dispersion of acicular magnetite particles;

(2) adding an aqueous solution of a magnetism salt to said suspension in the process of the cobalt coating reaction; and (3) continuing to heat and stir the resulting mixture completing said cobalt coating reaction, thereby forming an upper coating layer composed of Co- and Mg-containing ferrite having a spinel structure on the surface of the lower coating layer composed of Co-containing ferrite having a spinel structure, which is formed on the surface of each acicular magnetite particle.

6. Co-coated acicular magnetite particles each comprising:

an acicular magnetite particle as the core particle;

a lower coating layer 4 to 50 Å thick of Co-containing spinel ferrite, which is formed on the surface of said acicular magnetite particle; and an upper coating layer 2 to 20 Å thick of Co- and Mg-containing spinel ferrite, which is formed on said lower coating layer, and said particles having an aspect ratio (major axial diameter/minor axial diameter) of not less than 4, a coercive force of 580 to 900 Oe, a saturation magnetization of 77 to 90 emu/g, a reduction ratio of the Fe$^{2+}$ content after said Co-coated acicular magnetite particles were permitted to stand at a temperature of 60° C. and a humidity of 90% for 14 days of not more than 51%, and a change of the coercive force after said Co-coated acicular magnetite particles were permitted to stand at a temperature of 60° C. and a humidity of 90% for 14 days of −10 to +5%, the $Fe^{2+}$ content of the Co-coated acicular magnetite particles being 10 to 24 wt %, the cobalt content thereof being 0.1 to 10 wt % (calculated as Co), and the magnesium content thereof being 0.2 to 3.5 wt % (calculated as Mg), said particles obtained by a process comprising the steps of:

(1) heating and stirring a suspension obtained by adding an aqueous alkali hydroxide solution, an aqueous solution of a cobalt salt and an aqueous solution of a ferrous salt to an aqueous dispersion of acicular magnetite particles;

(2) adding an aqueous solution of a magnesium salt to said suspension in the process of the cobalt coating reaction; and (3) continuing to heat and stir the resulting mixture so to complete said cobalt coating reaction, thereby forming an upper coating layer composed of Co- and Mg-containing ferrite having a spinel structure on the surface of the lower coating layer composed of Co-containing ferrite having a spinel structure, which is formed on the surface of each acicular magnetite particle.

* * * * *